United States Patent
Menges et al.

(10) Patent No.: US 8,875,435 B2
(45) Date of Patent: Nov. 4, 2014

(54) ACTUATOR FOR SETTING AT LEAST ONE OPTICAL PROPERTY

(75) Inventors: Dietmar Menges, Absam (AT); Helmut Wiedermann, Pill (AT)

(73) Assignee: Swarovski-Optik KG, Absam (AT)

( * ) Notice: Subject to any disclaimer, the term of this patent is extended or adjusted under 35 U.S.C. 154(b) by 414 days.

(21) Appl. No.: 12/068,098

(22) Filed: Feb. 1, 2008

(65) Prior Publication Data
US 2008/0289239 A1 Nov. 27, 2008

(30) Foreign Application Priority Data
Feb. 14, 2007 (AT) .................................. A 228/2007

(51) Int. Cl.
*F41G 1/38* (2006.01)
*F41G 1/40* (2006.01)
*G02B 23/14* (2006.01)

(52) U.S. Cl.
CPC .. *F41G 1/38* (2013.01); *F41G 1/40* (2013.01); *G02B 23/14* (2013.01)
USPC ............................................. 42/122; 42/119

(58) Field of Classification Search
USPC .................................... 42/122, 135–137, 139
See application file for complete search history.

(56) References Cited

U.S. PATENT DOCUMENTS

| 3,280,463 | A | * | 10/1966 | Stadler | 42/122 |
| 3,990,155 | A | * | 11/1976 | Akin et al. | 42/122 |
| 4,392,723 | A | | 7/1983 | Gehmann | |
| 6,279,259 | B1 | * | 8/2001 | Otteman | 42/122 |
| 6,643,970 | B2 | * | 11/2003 | Huber | 42/122 |
| 2004/0144013 | A1 | | 7/2004 | Leatherwood | |

FOREIGN PATENT DOCUMENTS

| DE | 30 04 635 | 8/1981 |
| WO | 2006/003265 | 1/2006 |
| WO | 2006/017868 | 2/2006 |
| WO | 2006/017869 | 2/2006 |

\* cited by examiner

*Primary Examiner* — Gabriel Klein
(74) *Attorney, Agent, or Firm* — Wenderoth, Lind & Ponack, L.L.P.

(57) ABSTRACT

An Actuator is provided for setting at least one optical property, in particular the position of a crosshair, of an aiming device, in particular of a telescopic sight, with a coupling part rotatable about an axis of rotation, onto which the at least one index element can be pushed. The actuator has a guiding device for guiding the index element onto the coupling part which makes it possible to push the index element onto the coupling part in the direction of the axis of rotation of the coupling part and to prevent a rotation of the index element relative to the coupling part when it is completely and/or partly pushed onto the coupling part at least in a direction perpendicular to the axis of rotation, and preferably in all directions.

23 Claims, 3 Drawing Sheets

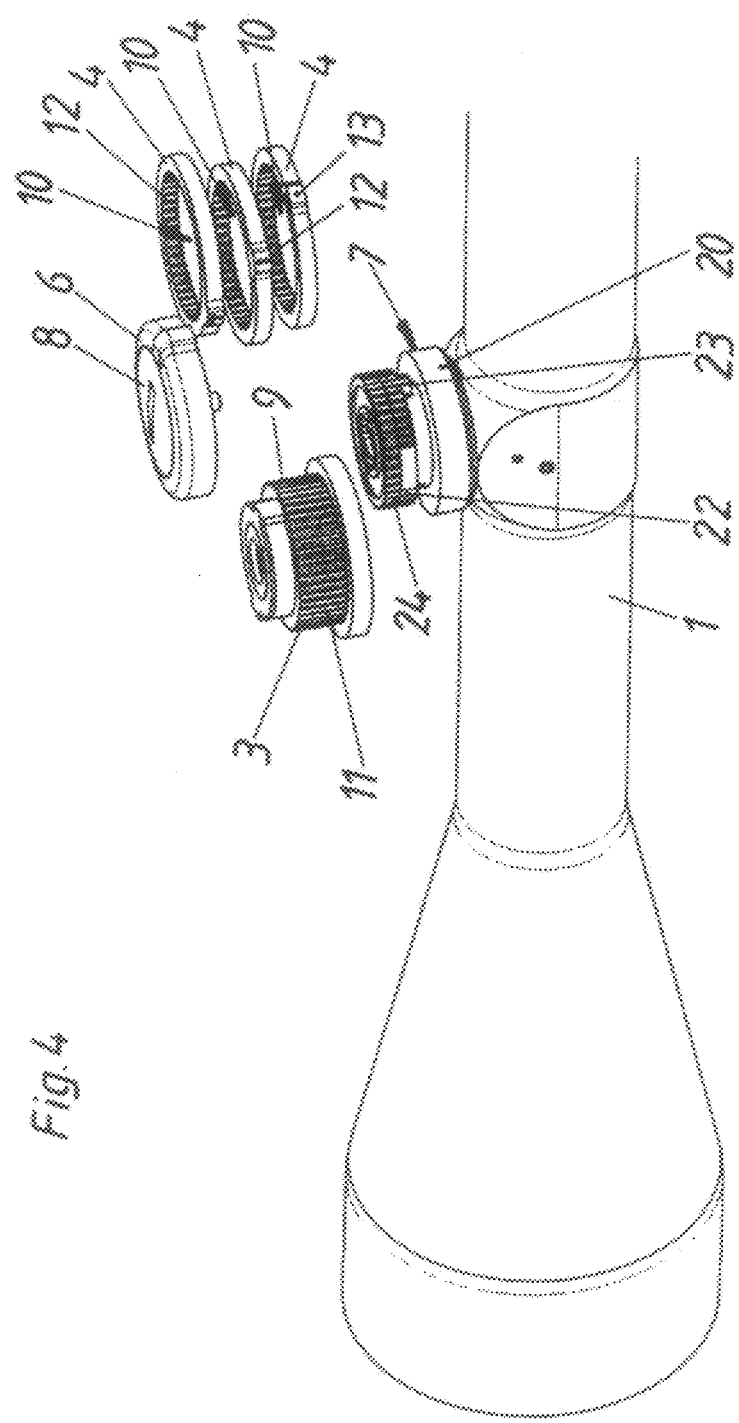

ACTUATOR FOR SETTING AT LEAST ONE OPTICAL PROPERTY

BACKGROUND OF THE INVENTION

The present invention relates to an actuator for setting at least one optical property, in particular the position of a crosshair, of an aiming device, in particular of a telescopic sight. The Actuator has a coupling part rotatable about an axis of rotation, onto which at least one index element can be pushed. The invention also relates to an aiming device, in particular a telescopic sight, with such an actuator.

Generic actuators, also called sights, with one or more index elements that can be pushed on, can for example be used to correct the ballistics of a crosshair of a reticle of an aiming device or of a telescopic sight. Correcting the ballistics involves adjusting the crosshair, depending on the shooting distance, the ballistics properties of the ammunition used, or the ballistics properties of different types of ammunition. The index elements can then, via corresponding index marks, display the position to be chosen in each case of the actuator, and thus of the crosshair, for the shooting distance and/or the type of ammunition used.

In the state of the art it is known to use different actuators for different ballistics. This is very costly, as the actuator has to be changed each time. It is also known in the state of the art to push annular index elements onto a coupling part of the actuator. The index elements are then housed rotatably against one another and against the coupling part on the latter as long as no adhesive force is caused by a cover being screwed on. The danger thereby arises that, before or as a result of screwing on the cover, an unintended adjustment of the previously-set index elements takes place.

SUMMARY OF THE INVENTION

The object of the invention is to improve a generic actuator so that the described unintended adjustment of the index elements is avoided.

This is achieved according to the invention in that, to guide the index element on the coupling part, the actuator has a guiding device which makes it possible to push the index element onto the coupling part in the direction of the axis of rotation of the coupling part, and prevents a rotation of the index element relative to the coupling part when it is completely and/or partly pushed onto the coupling part at least in a direction perpendicular to the axis of rotation, and preferably in all directions.

According to a basic idea of the invention, it is thus provided that the guiding device makes it possible to push the index element(s) onto the coupling part. However, once the index elements are pushed onto the coupling part, they are held rotation-resistantly thereon by means of the guiding device, and rotation in a plane perpendicular to the axis of rotation is thus no longer possible. The index elements are thus pushed onto the coupling part at the same angle setting in which they are then to remain until they are removed from the coupling part again for a change of the relative position of the index elements.

It can be provided that the guiding device allows the index element to be pushed onto the coupling part at several angles different from one another relative to the axis of rotation. It is favourable if the several angles, different from one another, are incremented, preferably uniformly. By incrementation it is meant that the angles can be realized, not continuously, but at discrete distances from one another, thus following a certain pitch or step.

As a rule, it is advisable for several, preferably two or three or four, index elements to be pushed onto the coupling part, wherein these index elements can be arranged simultaneously on the coupling part.

A preferred embodiment provides that the guiding device has a toothing with ridges and recesses running parallel to the axis of rotation of the coupling part and engaging in one another when the index ring(s) is (are) pushed on. The ridges and recesses can be shaped in the form of teeth but also in other ways, as long as they prevent an unintentional rotation of the index elements against the coupling part when pushed on.

In principle it is sufficient if the guiding device has a first guiding element with at least one ridge or recess, and a second guiding element with several ridges or recesses. The at least one ridge or recess of the first guiding element engages with the ridges or recesses of the second guiding element when the index ring(s) is (are) pushed onto the coupling part. The first guiding element can be attached, preferably moulded on in one piece, to the coupling part, preferably to an outer surface area of the coupling part. The second guiding element can be attached, preferably moulded on in one piece, to the index element, preferably in a recess of the index element, or vice versa. A particularly preferred embodiment provides, however, that the first guiding element and/or the second guiding element has (have) a succession of ridges and recesses extending, preferably uniformly incremented, over an angular range of 360°.

In order to prevent the loss of the index elements once they have been pushed onto the coupling part, a cover which can be fixed, preferably screwed, onto the actuator can additionally be provided. When fixed on to the actuator, the cover prevents the index element(s) from being pulled off or slipping off the coupling part. In contrast to the state of the art, this cover merely provides additional protection. It is not necessary to prevent an unintended rotation of the index elements against the coupling part.

BRIEF DESCRIPTION OF THE DRAWINGS

Further details and features of the present invention are shown with the help of a preferred embodiment in the following description of the Figures. IN THE DRAWINGS:

FIG. 4 is a perspective side view of a front part of a telescopic sight with the actuator according to the invention and as shown in FIGS. 1 to 3, wherein the cover, the coupling part and the index elements are represented removed from the rest of the actuator.

DETAILED DESCRIPTION OF THE INVENTION

Figure 1:
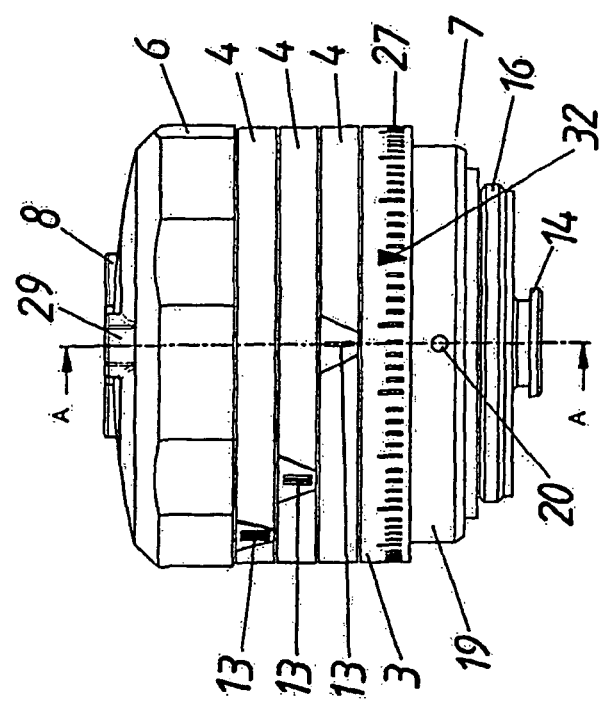
FIG. 1 is a side view of the preferred embodiment.

In the side view according to FIG. 1 there can be seen the cover 6 screwed on with the screw 8 and the three index elements 4 lying underneath, pushed onto the coupling part 3. Each of the index elements 4 bears an index mark 13 which makes it possible to quickly find the ballistic-correction setting necessary for the respective distance and/or the respective type of ammunition. The bottom ring of the coupling part 3 bears the scale 27 which shows the pitch or incrementation of the different angles in which the index elements 4 can be pushed onto the coupling part 3. Part of the scale 27 is the zero point 32 whose function is explained in detail below. The so-called zero index mark 20 is attached to a rotation-resistant intermediate casing 19 (stationary base portion) connected or connectable to the detent housing 16 or the telescopic sight. Projecting downwards from the detent housing 16 is a spindle 14 which—as explained below in detail—can be screwed into and out of the detent housing 16 by rotating the coupling part 3. The spindle 14 presses—in a known manner, but not represented here in detail—on an inner tube arranged in the main tube 1 of the telescopic sight, represented by way of example in FIG. 4, which bears the crosshair or the reticule. By screwing in or unscrewing the spindle 14, the position of the reticule or of the crosshair in the main tube 1 of the telescopic sight and thus in a view through the telescopic sight can thus be adjusted. All markings known in the state of the art for aiming and/or estimating the distance or suchlike come into consideration as crosshairs, such as e.g. graticules.

Figure 2:
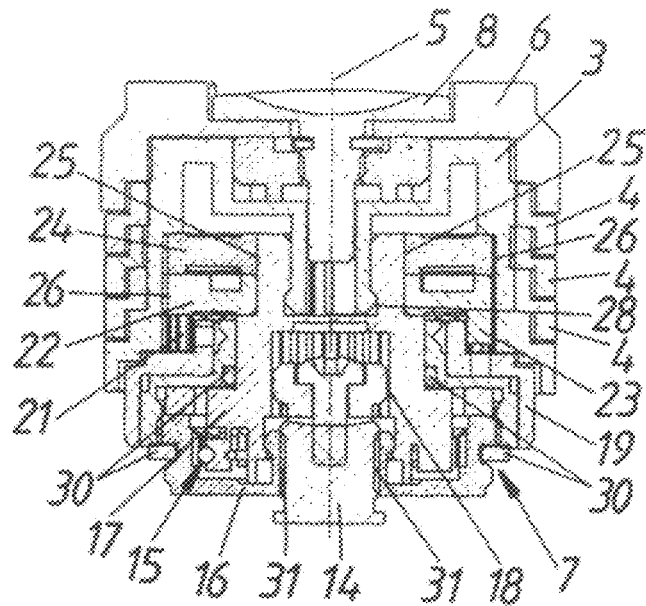
FIG. 2 is a longitudinal section through the actuator shown in FIG. 1.

Before the setting or alignment of the actuator is explained in detail with the help of FIG. 2, a guiding device 11, 12 for guiding the index elements 4 on the coupling part 3 is explained first, with reference to FIG. 4. In this representation, the coupling part 3 is represented removed from the transmission device 7 and the index elements 4 from the coupling part 3. The same applies to the cover 6 and the associated screw 8. The coupling part 3 has a substantially cylindrical outer surface area 9 in an area which is provided for the pushing on engaging of the index elements 4. The term "substantially cylindrical" relates to the basic shape of the outer surface area 9, overlaid on the first guiding element 11 of the guiding device. A large number of ridges and recesses running parallel to the axis of rotation 5 of the coupling part 3 are provided on this outer surface area 9 as a first guiding element 11. In this example, these ridges and recesses are attached in one piece to the outer surface area 9. However, this need not essentially be the case. The index elements 4 are formed substantially annular, and each has a substantially circular recess 10, and in each case a second guiding element 12 in the form of a toothing complementing the toothing of the first guiding element 11 is provided on the inside surface of the second guiding element 12. Here also the ridges and recesses of the toothing are moulded in one piece onto the index elements 4. This is also not essential. In the embodiment example shown, the toothing of the first and second guiding elements 11 and 12 extend in each case with uniform incrementation or pitch over an angle range of 360°. This also need not essentially be the case. It would also suffice if either the first or the second guiding element 11, 12 were to have only one ridge or only one recess. This too would ensure a rotation-resistant arrangement of the index elements 4 on the coupling part 3.

In FIG. 4, by pulling off the coupling part 3, the adjustment disk 24 and locking disk 22 otherwise arranged lying inside in the coupling part can be seen. These also bear toothings which engage with an internal toothing 26, not visible in FIG. 4, of the coupling part 3 when pushed on i.e., when the coupling part 3 is inserted on and engages the adjustment disk 24 and locking disk 22.

The mode of operation of the transmission device 7 chosen in this embodiment for transmitting a rotary movement of the coupling part 3 onto the spindle 14 is now described with the help of the sectional representation according to FIG. 2. In the pushed-on (fitted and engaged) state represented in this Figure, the cover 6, the coupling part 3, and the index elements 4 are connected rotation-resistantly to one another. Via a toothing 26, this also applies to the adjustment disk 24 and the locking disk 22. The adjustment disk 24 is in turn connected rotation-resistantly via a toothing 25 to a nut 17. By means of the snap-action connection 28, the coupling part 3 rests in a corresponding recess of the nut 17. The screw 8 for attaching the cover 6 can advantageously be screwed so far into the coupling part 3 that an undesired loosening of the snap-action connection 28 in the installation position shown in FIG. 2 is prevented by blocking of the snap-action movement.

Provided inside the nut 17 is a toothing 18 which in turn has teeth running in the direction parallel to the axis of rotation 5. A corresponding toothing of the spindle 14 engages in these teeth of nut 17, whereby the spindle 14 can be rotated by turning the coupling part 3. When the spindle 14 is turned in the corresponding direction in each case, the spindle is screwed in or unscrewed via the thread 31 arranged between the detent housing 16 and the spindle 14. The detent housing 16 and the intermediate casing 19 connected rotation-resistantly to it are connected rotation-resistantly to the main tube 1 of the telescopic sight when pushed onto the telescopic sight. The seals 30 guarantee the gas-tightness of the actuator.

When the coupling part 3 is rotated about the axis of rotation 5, there is thus a relative rotation of the components connected rotation-resistantly to the coupling part 3 against the intermediate casing 19 (stationary base portion) and the detent housing 16. A catch, provided between the nut 17 and the detent housing 16, ensures an incremented, thus stepwise, rotation of the coupling part 3 or of the transmission device 7 (i.e., the catch 15 controls the manner of rotation of the coupling part 3). The pitch or incrementation of the catch 15 favourably corresponds to the incrementation or pitch visualized by means of the scale 27 of the teething of the guiding elements 11 and 12, and thus to the incrementation predetermined by the guiding device for pushing fitting the index elements 4 onto the coupling part 3.

In order to guarantee unambiguous positioning, the maximum angle of rotation is limited to below 360°. To this end, the locking disk 22, connected rotation-resistantly to the coupling part 3 when pushed on, has a stop nose 23 which, at a corresponding angle of rotation, strikes the stop pin 21. The stop pin 21 is fixed in its position on the intermediate casing 19, and thus limits the maximum possible angle of rotation.

An alignment between the scale 27, the catch 15, and the zero index 20 and additionally also the index marks 13 of the index elements 4 is ensured by the described construction with the corresponding toothings 11, 12, 25, 26 and 15. There is thus alignment between scale 27 and the index elements 4 when the index elements 4 are pushed on the coupling part 3. The scale 27 serves to set the azimuth positions of the index elements 4 relative to the basic position. To this end, the scale 27 possesses the zero point 32. The number of graduation marks can be given in a table or the like by which the index elements 4 are to be fitted to the coupling part 3 rotated vis-à-vis the zero point 32, depending on the ballistics and the distance from the target. This setting can thus also take place with the coupling part removed. After basic adjustment, the coupling part 3 is then fitted such that the zero point 32 stands above the zero index 20 on the stationary base portion.

Figure 3:
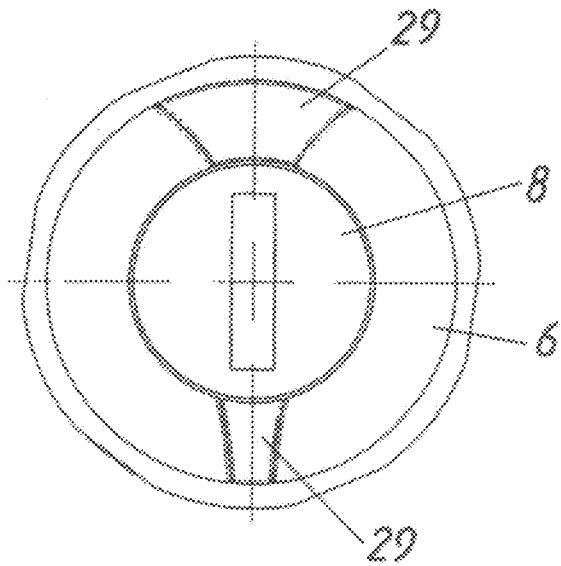
FIG. 3 is a top view of the actuator shown in FIG. 1.

Additionally the cover 6 also bears an arrow-like configuration element 29 which advantageously, in the position shown in FIG. 1, in which the lowermost index mark 13 is arranged directly above the zero index 20, likewise points towards the zero index 20. The zero index 20 advantageously points in the direction of the eyepiece, not represented in FIG. 4, and thus in the direction of the user. Also, in the top view according to FIG. 3, it can easily be seen through the configuration element 29 whether or not the actuator is in the basic position.

For the basic adjustment of the telescopic sight to the weapon, firstly the cover 6 and the coupling part 3 are removed from the transmission device 7. The adjustment disk 24 thereby appears as represented in FIG. 4. The basic adjustment can be carried out through rotation of the adjustment disk 24 and the associated movement of the spindle 14. The locking disk 22 is housed loosely rotatable on the nut 17. After this basic adjustment, the locking disk 22 is rotated until the stop nose 23 touches the stop pin 21. The coupling part 3 is then fitted on transmission device 7, leading to an arrest between locking disk 22, adjustment disk 24, and coupling part 3 via the toothing 26. The respective positions of the crosshair can now be sought successively for different distances and/or types of ammunition by rotating the spindle 14. If such a position is found, the index element 4 provided therefor having a correspondingly aligned index mark 13 is pushed (fitted) on coupling part 3, whereby the index element 4 is then housed rotation-resistantly on the coupling part 3, with the result that the position for the next index mark 13 of the next index element 4 can be sought without danger of further shifting of the already pushed (fitted) on index element 4. After the final index' mark 13 has also been aligned in this manner, the cover 6 can be screwed on by means of the screw 8. The adjustment process is thus finished.

As already shown, the term toothing is to be viewed very generally. The ridges and recesses provided therefor can be designed in the most varied manner. Moreover, a guiding device according to the invention need not necessarily have the toothings of the guiding elements 11 and 12 that are represented in FIG. 4. It would, for example, alternatively also be possible to provide corresponding toothings or suchlike on the outside of the index elements 4, which are then arrested, rotation-resistant with the coupling part 3, by a separate pin housed outside on the coupling part 3 when pushed (fitted) on. It would also be possible for example, instead of the inner or outer toothings, to provide in the index elements 4 holes correspondingly incremented in their distance from one another, which in turn can be fixed rotation-resistantly by a pin attached correspondingly to the coupling part 3. Thus, these other variations of the guiding device are also configured to ensure the index elements 4 remain interlocked with the coupling part 3 to prevent relative rotation. There are also other embodiment variants according to the invention of a corresponding guiding device which, as described above, are all configured to allow the index elements 4 to engage with the coupling part 3 so as to guide the index elements 4 to be fitted onto the coupling part 3 while preventing rotation of the index elements 4 relative to the coupling part 3, even when the index elements are just partly fitted onto the coupling part 3.

The invention claimed is:

1. An actuator for setting at least one optical property of an aiming device for a barrel, comprising:
   a coupling part rotatable about an axis of rotation;
   a dial fitted on said coupling part and having a set of markings collectively forming a scale relating to a set of distances from the aiming device for the barrel, each of said markings representing a position of a crosshair of the aiming device corresponding to at least one of a particular distance and ammunition for the barrel, said dial comprising a plurality of ring-shaped index elements each having a respective one of said markings;
   a guiding device for allowing engagement of said coupling part with said dial in a non-rotatable manner, said guiding device comprising longitudinal serrations on said coupling part and on each of said ring-shaped index elements, said longitudinal serrations being configured to allow non-rotatable stacking and engagement of said ring-shaped index elements on said coupling part in any of a plurality of equally spaced angular positions relative to said coupling part so as to form said scale; and
   a transmission device including:
      a stationary base portion to be mounted to the barrel; and
      an adjustment disk mounted on said stationary base portion so as to be rotatable relative to said stationary base portion, said coupling part being detachably mounted on said adjustment disk so as to be non-rotatable relative to said adjustment disk.

2. The actuator of claim 1, further comprising a spindle for adjusting an alignment of a telescopic sight of the aiming device, said coupling part having a catch configured to ensure a uniform incremental rotation of said coupling part, wherein said uniform incremental rotation ensured by said catch and said equally spaced angular positions determined by said guiding device are the same in position and in step width.

3. The actuator of claim 1, further comprising a spindle for adjusting an alignment of a telescopic sight of the aiming device, said transmission device having a catch configured to ensure a uniform incremental rotation of said coupling part.

4. The actuator of claim 1, wherein said plurality of ring-shaped index elements comprises at least three ring-shaped index elements fitted on said coupling part.

5. The actuator of claim 1, wherein said coupling part has a substantially cylindrical outer surface area at least in an area on which said index elements are fitted.

6. The actuator of claim 1, wherein each respective one of said ring-shaped index elements has said respective one of said markings located on an outer circumferential surface of said each respective one of said ring-shaped index elements.

7. The actuator of claim 1, wherein said coupling part and each of said ring-shaped index elements has a succession of uniformly incrementally-spaced longitudinal serrations extending over an angular range of 360°.

8. The actuator of claim 1, further comprising a cover for preventing said index elements from being pulled off of said coupling part.

9. The actuator of claim 1, wherein said scale further includes a zero point marking on an outer circumferential surface of said coupling part, said scale being configured so that said markings and said zero point are visible when said ring-shaped index elements are fitted on said coupling part.

10. The actuator of claim 1, wherein said coupling part has a zero point marking on an outer circumferential surface thereof so that said zero point marking is visible when said coupling part is rotatably and detachably supported on said transmission device.

11. The actuator of claim 1, wherein said stationary base portion has a stop pin, and said transmission device further includes a rotatable locking disk mounted to said adjustment disk so as to be non-rotatable relative to said adjustment disk, said locking disk having a stop nose for contacting said stop pin of said stationary base portion to limit an angle of rotation of said adjustment disk.

12. The actuator of claim 1, wherein said stationary base portion has a visible zero index for allowing alignment of said scale with said stationary base portion.

13. An actuator for setting at least one optical property of an aiming device, comprising:
   a coupling part rotatable about an axis of rotation;
   a dial fitted on said coupling part and having a set of markings collectively forming a scale relating to a set of distances from the aiming device, each of said markings representing a position of a crosshair of the aiming device corresponding to at least one of a particular distance and ammunition, said dial comprising a plurality of ring-shaped index elements, each one of said ring-shaped index elements having an outer circumferential surface and a respective one of said markings located on said outer circumferential surface;

a guiding device for allowing engagement of said coupling part with said dial in a non-rotatable manner, said guiding device comprising longitudinal serrations on at least one of said coupling part and said ring-shaped index elements, said longitudinal serrations being configured to allow non-rotatable stacking and engagement of said ring-shaped index elements on said coupling part in any of a plurality of equally spaced angular positions relative to said coupling part so as to form said scale; and a transmission device including:

a stationary base portion; and an adjustment disk mounted on said stationary base portion so as to be rotatable relative to said stationary base portion, said coupling part being detachably mounted on said adjustment disk so as to be non-rotatable relative to said adjustment disk.

14. The actuator of claim 13, further comprising a spindle for adjusting an alignment of a telescopic sight of the aiming device, said coupling part having a catch configured to ensure a uniform incremental rotation of said coupling part, wherein said uniform incremental rotation ensured by said catch and said equally spaced angular positions determined by said guiding device are the same in position and in step width.

15. The actuator of claim 13, further comprising a spindle for adjusting an alignment of a telescopic sight of the aiming device, said transmission device having a catch configured to ensure a uniform incremental rotation of said coupling part.

16. The actuator of claim 13, wherein said plurality of ring-shaped index elements comprises at least three ring-shaped index elements fitted on said coupling part.

17. The actuator of claim 13, wherein said coupling part has a substantially cylindrical outer surface area at least in an area on which said index elements are fitted.

18. The actuator of claim 13, wherein said coupling part and each of said ring-shaped index elements has a succession of uniformly incrementally-spaced longitudinal serrations extending over an angular range of 360°.

19. The actuator of claim 13, further comprising a cover for preventing said index elements from being pulled off of said coupling part.

20. The actuator of claim 13, wherein said scale further includes a zero point marking on an outer circumferential surface of said coupling part, said scale being configured so that said markings and said zero point are visible when said ring-shaped index elements are fitted on said coupling part.

21. The actuator of claim 13, wherein said coupling part has a zero point marking on an outer circumferential surface thereof so that said zero point marking is visible when said coupling part is rotatably and detachably supported on said transmission device.

22. The actuator of claim 13, wherein said stationary base portion has a stop pin, and said transmission device further includes a rotatable locking disk mounted to said adjustment disk so as to be non-rotatable relative to said adjustment disk, said locking disk having a stop nose for contacting said stop pin of said stationary base portion to limit an angle of rotation of said adjustment disk.

23. The actuator of claim 13, wherein said stationary base portion has a visible zero index for allowing alignment of said scale with said stationary base portion.

* * * * *